United States Patent [19]

Asada

[11] Patent Number: 4,866,538
[45] Date of Patent: Sep. 12, 1989

[54] IMAGE FORMING APPARATUS

[75] Inventor: Kenichirou Asada, Tokyo, Japan

[73] Assignee: Ricoh Company, Ltd., Tokyo, Japan

[21] Appl. No.: 144,170

[22] Filed: Jan. 15, 1988

[30] Foreign Application Priority Data

Jan. 20, 1987 [JP] Japan .................................. 62-10859

[51] Int. Cl.$^4$ ......................... H04N 1/29; H04N 1/23; G01D 15/06; G01D 9/42
[52] U.S. Cl. .................................... 358/300; 358/296; 346/108; 346/155
[58] Field of Search ................ 358/298, 300; 346/108, 346/155

[56] References Cited

U.S. PATENT DOCUMENTS 4,679,057 7/1987 Hamada ............................ 346/76 L
4,709,250 11/1987 Takeuchi ............................ 346/160

Primary Examiner—C. L. Albritton
Assistant Examiner—Scott A. Rogers
Attorney, Agent, or Firm—Oblon, Spivak, McClelland, Maier & Neustadt

[57] ABSTRACT

An image forming apparatus which produces image data by reading an original document, modulates a light beam to be radiated from a light emitting element by the image data, and exposes an electrophotographic conductive element imagewise by the light beam modulated. The power of the modulated beam is varied dot by dot in association with tones. The apparatus renders multiple tones without lowering resolution.

8 Claims, 4 Drawing Sheets

⟹ SCANNING DIRECTION

IMAGE FORMING APPARATUS

BACKGROUND OF THE INVENTION

The present invention relates to an image forming apparatus which produces image data by reading an original document, modulates a light beam issuing from a light emitting element by the image data, and exposes an electrophotographic photoconductive element by the light beam modulated to thereby form an image. More particularly, the present invention is concerned with an image forming apparatus capable of rendering an image with multiple tones without degrading resolution.

Today, a digital copier which reads a document by a CCD (charge coupled device) line sensor or like image reader and applies the resulting data to, for example, a laser printer is extensively 8used. Documents applicable to such a digital copier include photographs and drawings each having multiple tones. In the case that image data produced by reading a document having tones are fed to a laser printer, it is a common practice to render the tones by using a dither matrix method which per se is well known in the art. The dither matrix method is such that one pixel is represented by a 4×4 matrix so as to render sixteen different tones. A greater number of tones are achievable by increasing the matrix size, e.g., sixty-four tones may be rendered by an 8×8 matrix.

A drawback with the prior art multi-tone representation scheme is that the increase in matrix size as needed to accommodate a greater number of tones results in coarse pixels and, therefore, poor resolution.

For details of this kind of image forming apparatus, a reference may be made to Japanese Laid-Open Patent Publication (Kokai) Nos. 61-189754/1986, 61-189575/1986, 61-189577/1986 and others.

SUMMARY OF THE INVENTION

It is an object of the present invention to provide an image forming apparatus which renders multiple tones without lowering resolution.

It is another object of the present invention to provide a generally improved image forming apparatus.

In accordance with the present invention, in an image forming apparatus which produces image data by reading an original document, modulates a light beam to be radiated from a light emitting element by the image data, and exposes an electrophotographic conductive element imagewise by the beam modulated to form an image on the conductive element, a current fed to the light emitting element for each pixel of the image data is varied in association with a tone of the data for thereby subjecting the image data to power modulation.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

A preferred embodiment of the image forming apparatus in accordance with the present invention will be described.

Figure 2:
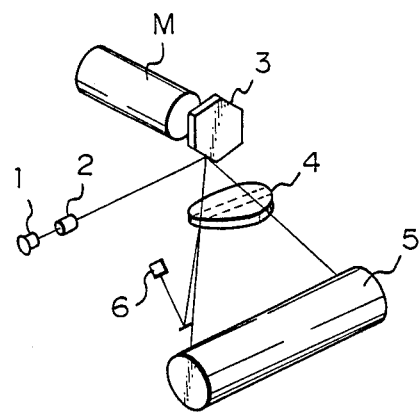
FIG. 2 is a view schematically showing a laser printer to which the present invention is applicable.

Referring to FIG. 2, modulated rays issuing from a laser diode 1 are transformed into a light beam by a collimator 2. A deflector 3 which is rotated by a motor M deflects the light beam resulting in the ligh beam sequentially scanning the surface of a photoconductive drum 5 through a condenser 4. A photosensor 6 serves to detect the start of scanning of the drum 5 by the laser beam.

Figure 3:
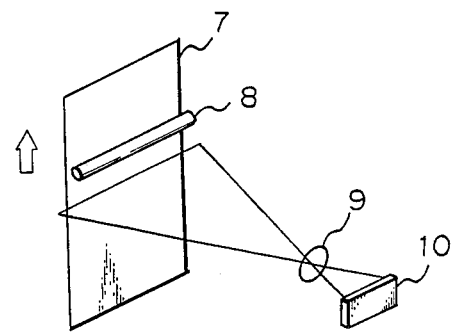
FIG. 3 is a view schematically showing an image input device for reading an image.

As shown in FIG. 3, an image reader includes a light source 8 for illuminating an original document 7. The light reflected by the document 7 is focused on the light-sensitive surface of a CCD line sensor 10 by a lens which is located to face the document 7. The CCD line sensor 10 photoelectrically converts the incident light to produce image data.

Figure 1:
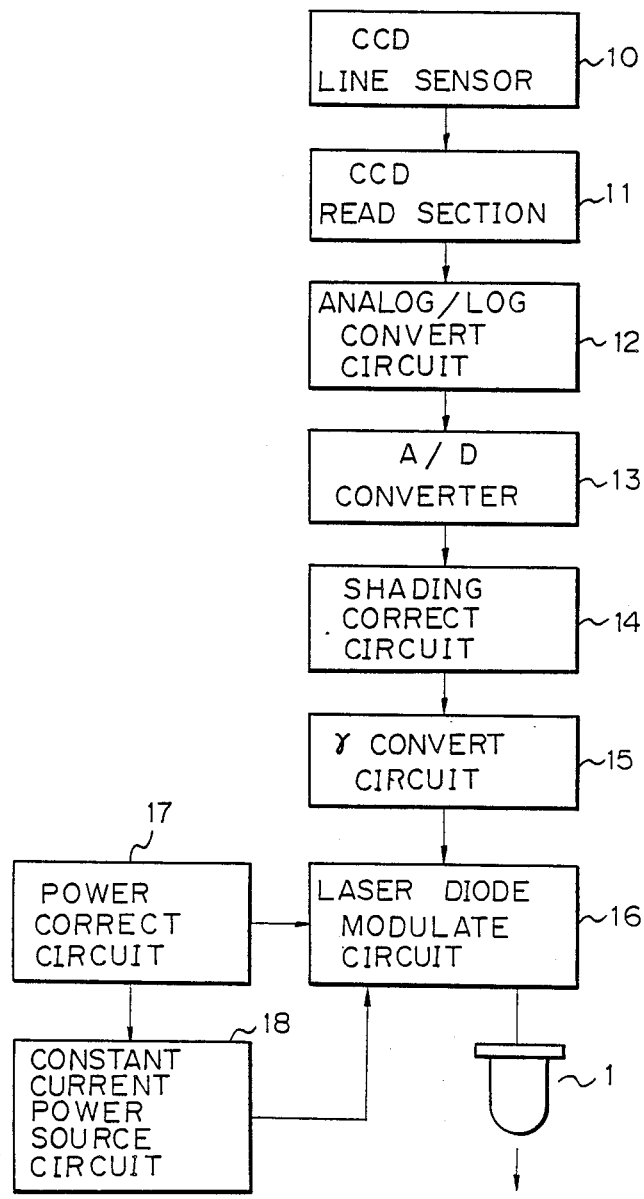
FIG. 1 is a schematic block diagram showing an image forming apparatus embodying the present invention.

Referring to FIG. 1, a CCD reading section 11 processes image data which are outputted by the CCD line sensor 10, thereby producing an analog pixel signal. This pixel signal is applied to an analog/logarithm (LOG) conversion circuit 12 for density conversion. The output of the circuit 12, i.e., a density signal is converted by an analog-to-digital (AD) converter 13 into a digital signal having six to eight bits. The output of the AD converter 13 is fed to a shading correction circuit 14. Image data outputted by the circuit 14 and undergone shading correction are subjected to gamma conversion at a gamma conversion circuit 15 and, then, applied to a laser diode modulation circuit 16. In response, the laser diode modulation circuit 16 drives the laser diode 1, FIG. 2, to thereby produce a power-modulated light beam. A power correction circuit 17 is connected to the laser diode modulation circuit 16 so that the output power of the laser diode 1 remains the same for data of the same tone. Specifically, the I-L curve of the laser diode 1, i.e., a curve representative of light power L relative to injection current I of the laser diode 1 fluctuates with the ambient temperature. In light of this, the power correction circuit 17 corrects the current value which is fed from a constant current power source circuit 18 to the laser diode 1 at predetermined timings other than power modulating timings, so that the light power remains the same for the same data which are outputted by the gamma conversion circuit 15.

Figure 4:
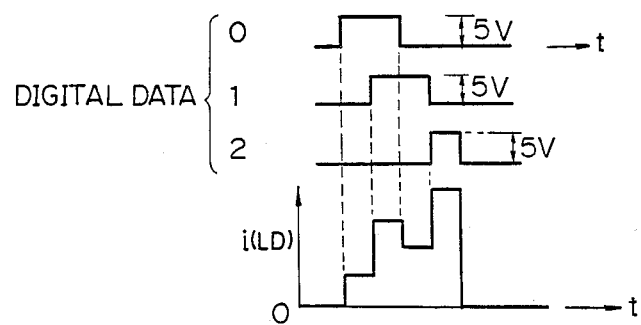
FIG. 4 is a chart exemplarily showing the waveform of a current which flows through a laser diode and the waveforms of input signals.

How the injection current of the laser diode 1 varies with the data in the event of power modulation is shown in FIG. 4.

Figure 5:
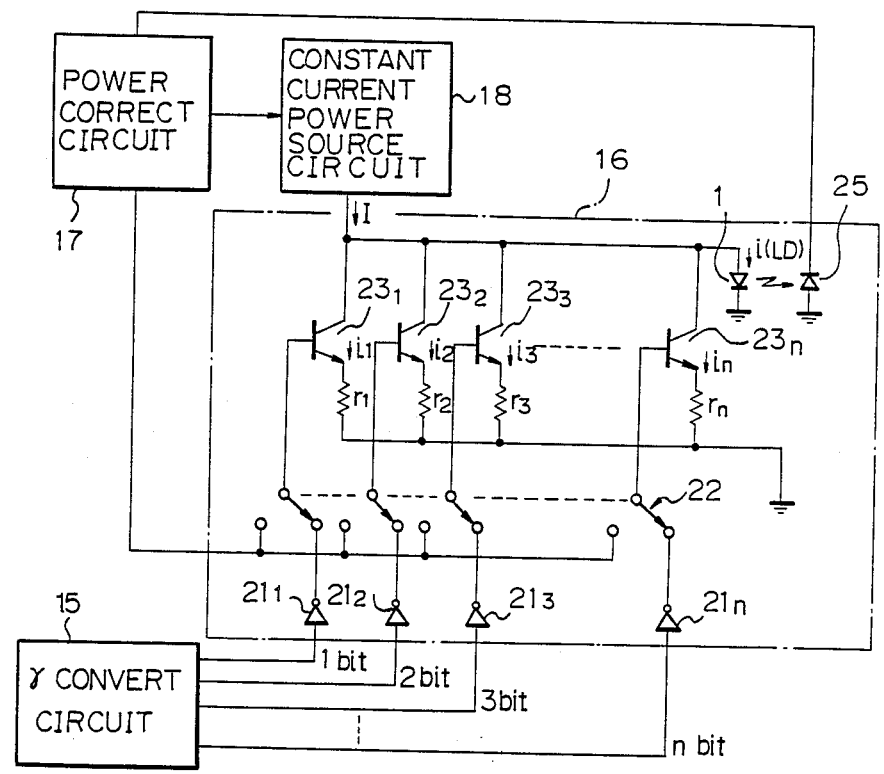
FIG. 5 is a schematic circuit diagram showing a specific construction of a laser diode modulation circuit.

Referring to FIG. 5, a specific construction of the laser diode modulation circuit 16 is shown in a schematic block diagram. As shown, the n-bit outputs of the gamma conversion circuit 15 are individually connected to inverters $21_1$ to $21_n$ the outputs of which are individually connected to an n-circuit two-contact switch 22. The switch 22 functions to select one of the outputs of the inverter and the output of the power correction circuit 17 at a time. The n outputs of the switch 22 are individually connected to the bases of transistors $23_1$ to $23_n$. Resistors $r_1$ to $r_n$ are individually connected between the emitters of the transistors $23_1$ to $23_n$ and ground. Collectors of the transistors $23_1$ to $23_n$ which are commonly connected are coupled to the output of the constant current power source circuit 18 and the laser diode 1. A light-sensitive element 25 is located in the vicinity of the laser diode 1 for the purpose of monitoring the intensity of laser beam radiating from the laser diode 1, the output of the light-sensitive element 25 being used to control the power correction circuit 17. Specifically, the laser beams issuing from the laser diode 1 is incident to the light-sensitive element 25, and the power correction circuit 17 controls the laser diode modulation circuit 16 and, thereby, the amount of output light of the laser diode 1, based on the output signal of the element 25.

In operation, the transistors $23_1$ to $23_n$ are individually turned on and off by the n-bit digital signals which are outputted by the gamma conversion circuit 15. Due to the presence of the inverters $21_1$ to 21hd n, it is when the output of the gamma conversion circuit 15 is (logical) low level that the transistors $23_1$ to $23_n$ become conductive. The current flowing through the laser diode 1 varies with the number of transistors $23_1$ to $23_n$ which are rendered conductive. When all the transistors $23_1$ to $23_n$ are conductive, a current i(LD) does not flow through the diode 1 at all while, when all the transistors $23_1$ to $23_n$ are non-conductive, a maximum current flows through the laser diode 1. As shown in FIG. 4, for example, when only a bit 0 is (logical) high level and the other bits are low level, only the transistor $23_1$ becomes non-conductive and the others become conductive. In this condition, a current represented by $(i_2+i_3+\ldots i_n)$ flows through all the transistors resulting that a current $i_1$ flows through the diode 1. The current $i_1$ is equal to the emitter current which flows when the transistor $23_1$ is conductive. In FIG. 4, three-bit drive is shown by way of example, and the resistance values $r_1$, $r_2$ an $r_3$ are assumed to be 4r, 2r and r, respectively (i.e. $r_1:r_2:r_3 = :4:2:1$).

Figure 6:
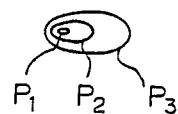
FIG. 6 is a diagram schematically showing dots as defined by a laser beam responsive to power control.

By the multi-level power modulation described above, the shape of a dot defined by the laser beam is varied as shown in FIG. 6. Specifically, three different tones $P_1$, $P_2$ and $P_3$ may be rendered by the three-tone power modulation control of FIG. 4.

As stated above, in accordance with the present invention, the power of laser beam is varied dot by dot so that one dot renders some tone. In this connection, the three laid-open patent publications previously mentioned are each constructed to render tones by controlling on a dot basis the period of time during which a laser beam is turned on.

Figure 7:
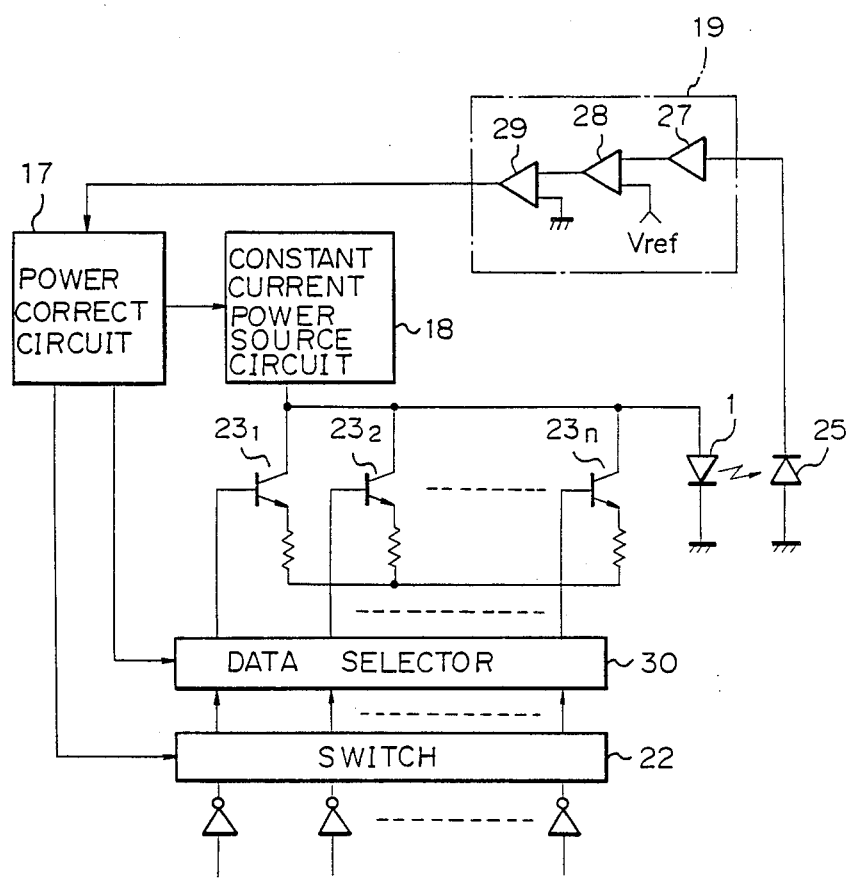
FIG. 7 is a schematic circuit diagram showing a specific arrangement for maintaining the output of a light-sensitive element at a predetermined value.

The output of the light-sensitive element 25, or light intensity sensor, is fed back to the power correction circuit 17 via a laser power feedback circuit 19, FIG. 7, so that the output current of the power source circuit 18 is so controlled as to maintain the output of the light-sensitive element 25 constant. The laser power feedback circuit 19 is made up of an amplifier 27 for amplifying an output of the light-sensitive element 25, a comparator 28 for comparing an output of the amplifier 27 with a reference voltage $V_{ref}$, and a binarizer 29 for binarizing an output of the comparator 28. Further, a data selector 30 is connected between the switch 22 and the bases of the transistors $23_1$ to $23_n$. When a region in which pixels are not to be written is specified, the data selector 30 operate to maintain the respective tone data at a predetermined value and, therefore, a predetermined current flows through the laser diode 1. At this instant, the intensity of light beam issuing from the laser diode 1 is sensed by the light-sensitive element 25 and compared by the comparator 28 with the reference value, whereby the intensity of light beam is actually determined. In response to the output of the comparator 28, the power correction circuit1 5 controls the constant voltage power source circuit 18 and, thereby, the current through the laser diode 1 such that the deviation becomes minimum.

In summary, it will be seen that the present invention provides an image forming apparatus which renders an image with high resolution without affecting the representation of tones. This is because the power of laser beam is varied dot by dot depending upon the tone.

Various modifications will become possible for those skilled in the art after receiving the teachings of the present disclosure without departing from the scope thereof.

What is claimed is:

1. An image forming apparatus, comprising:
   image reading means for reading an image of an original document to produce digital image data;
   said image reading means comprises a CCD (charge coupled device) reading circuit for producing an analog pixel signal by reading said image of said document, an analog/logarithm conversion circuit for producing a density signal by applying density conversion to said analog pixel signal, an analog-to-digital converter for converting said density signal into a digital signal;
   said image reading means further comprising a shading correction circuit for producing a shading-corrected signal by applying shading correction to said digital signal, and a gamma conversion circuit for generating a gamma-converted signal by applying gamma conversion to said shading-corrected signal; and
   modulating means for generating a light beam and performing a power modulation on said light beam in response to said gamma-converted signal.

2. An apparatus according to claim 1, wherein:
   said analog pixel signal contains information corresponding to a tone of said image of said original document.

3. An apparatus according to claim 2, wherein:
   said modulating means comprises means for applying power conversion to said digital data and a light-emitting element for generating said light beam in response to said gamma-converted signal.

4. An apparatus according to claim 3, wherein:
   said modulating means further comprises a power correction circuit for performing a power correction of said light beam from said light-emitting element such that said power correction remains the same for gamma-converted signals identical to said gamma-converted signal.

5. An apparatus according to claim 4, further comprising:
   a constant current power source circuit for said modulation circuit and said light-emitting element.

6. An apparatus according to claim 5, wherein:

said power correction circuit corrects a current value fed from said constant current power source to said light-emitting element during a predetermined time when said power modulation is absent.

7. An apparatus according to claim 3, further comprising;
a light-sensitive element responsive to an intensity of said light beam generated by said light-emitting element.

8. An apparatus according to claim 1, wherein:
said power correction circuit is constructed to maintain a constant quantity of light outputted by said light-emitting element.

* * * * *